(12) United States Patent
Yang

(10) Patent No.: US 10,933,966 B2
(45) Date of Patent: Mar. 2, 2021

(54) FLYING ROBOT WITH INTERNAL REAR PROJECTOR

(71) Applicant: X-CONTROL SYSTEM CO., LTD., Beijing (CN)

(72) Inventor: Fan Yang, Beijing (CN)

(73) Assignee: X-CONTROL SYSTEM CO., LTD., Haidian District Beijing (CN)

(*) Notice: Subject to any disclaimer, the term of this patent is extended or adjusted under 35 U.S.C. 154(b) by 369 days.

(21) Appl. No.: 15/753,162

(22) PCT Filed: Aug. 19, 2015

(86) PCT No.: PCT/CN2015/087516
§ 371 (c)(1),
(2) Date: Feb. 15, 2018

(87) PCT Pub. No.: WO2017/028275
PCT Pub. Date: Feb. 23, 2017

(65) Prior Publication Data
US 2018/0229828 A1    Aug. 16, 2018

(51) Int. Cl.
*B64C 39/02* (2006.01)
*B64B 1/06* (2006.01)
(Continued)

(52) U.S. Cl.
CPC .............. *B64B 1/06* (2013.01); *B64B 1/26* (2013.01); *B64B 1/34* (2013.01); *B64B 1/40* (2013.01);
(Continued)

(58) Field of Classification Search
CPC .... B64B 1/00; B64B 1/06; B64B 1/40; B64B 1/58; B64C 39/00; B64C 39/02;
(Continued)

(56) References Cited

U.S. PATENT DOCUMENTS 2,383,390 A * 8/1945 Jacobs ............. G09F 21/10
40/214
3,083,934 A * 4/1963 Vanderlip ............ B64C 27/20
244/5
(Continued)

FOREIGN PATENT DOCUMENTS

CN    2459732 Y    11/2001
CN    2657313 Y    11/2004
(Continued)

OTHER PUBLICATIONS

PCT International Search Report, PCT/CN2015/087516, dated Mar. 25, 2016, 5 Pages.

*Primary Examiner* — Richard R. Green
*Assistant Examiner* — Michael A. Fabula
(74) *Attorney, Agent, or Firm* — Fenwick & West LLP

(57) ABSTRACT

A flying robot (10) with projector, including a movable end (100) and a fixed end (200). A distributed working mode is used on the movable end (100) and the fixed end (200). The movable end (100) includes a top (110), a main body (120) and a bottom (130). The top (110) includes a lift system (112) and one or more proximity sensors (114); the main body (120) is a sealed hollow spherical body or spheroid body made of a film material capable of being used as a rear projection screen, and is filled with a gas of which the density is less than that of the air. The bottom (130) includes one or more rear projectors (131), a wireless communication module (132), a microcontroller (133), a battery (134), a direction and steering controlling device (135), a camera device (136), a sound capturing and reproduction device (137), a height sensor (138) and other sensors, etc. The fixed end (200) includes a wireless communication module (220), a control apparatus (240), a charging port (260), and other data interfaces, etc. The flying robot (10) with projector according to the present invention facilitates human-ma- (Continued)

chine interaction and is suitable for being used in both indoor and outdoor environments.

14 Claims, 5 Drawing Sheets

(51) Int. Cl.
| | |
|---|---|
| *G09F 21/06* | (2006.01) |
| *G03B 37/04* | (2021.01) |
| *B64B 1/34* | (2006.01) |
| *G03B 21/10* | (2006.01) |
| *B64B 1/26* | (2006.01) |
| *B64B 1/40* | (2006.01) |
| *G03B 29/00* | (2021.01) |
| *G09F 19/18* | (2006.01) |

(52) U.S. Cl.
CPC ............ *B64C 39/02* (2013.01); *B64C 39/024* (2013.01); *G03B 21/10* (2013.01); *G03B 29/00* (2013.01); *G03B 37/04* (2013.01); *G09F 19/18* (2013.01); *G09F 21/06* (2013.01); *B64C 2201/022* (2013.01); *B64C 2201/101* (2013.01); *B64C 2201/12* (2013.01); *B64C 2201/127* (2013.01)

(58) Field of Classification Search
CPC ............ B64C 39/064; B64C 2201/022; B64C 2201/10; B64C 2201/101; B64C 2201/12; A63H 27/10; A63H 2027/1058; A63H 2027/1066; G09F 19/00; G09F 19/02; G09F 21/00; G09F 21/06; G09F 21/08; G09F 21/10
USPC .................................................. 40/212, 214
See application file for complete search history.

(56) References Cited

U.S. PATENT DOCUMENTS

| | | | | |
|---|---|---|---|---|
| 3,839,631 A * | 10/1974 | Goddard | ................. | F21V 21/00 362/362 |
| 4,685,640 A * | 8/1987 | Warrington | ............... | B64B 1/00 244/23 C |
| 4,729,750 A * | 3/1988 | Prusman | ................ | A63H 27/10 446/225 |
| 4,931,028 A * | 6/1990 | Jaeger | .................... | A63H 27/10 244/30 |
| 5,071,383 A * | 12/1991 | Kinoshita | .............. | A63H 27/10 244/26 |
| 5,149,015 A * | 9/1992 | Davis | ........................ | B64B 1/40 244/190 |
| 5,429,542 A * | 7/1995 | Britt, Jr. | .................. | A63H 30/04 446/225 |
| 5,503,351 A * | 4/1996 | Vass | ....................... | B64C 39/064 244/12.2 |
| 6,053,451 A * | 4/2000 | Yu | ......................... | B64C 39/001 244/12.2 |
| 7,055,777 B2 * | 6/2006 | Colting | ..................... | B64B 1/02 244/30 |
| 7,077,553 B2 * | 7/2006 | Vanderschuit | ......... | A63H 27/10 362/253 |
| 7,341,224 B1 * | 3/2008 | Osann, Jr. | .............. | B64C 39/028 244/30 |
| 8,342,442 B1 * | 1/2013 | Dancila | ..................... | B64B 1/26 244/128 |
| 9,162,764 B2 * | 10/2015 | Babinsky | ............... | B64C 39/064 |
| 9,527,605 B1 * | 12/2016 | Gentry | .................... | B65G 43/00 |
| 10,109,224 B1 * | 10/2018 | Ratti | ....................... | G09G 3/005 |
| 10,246,186 B1 * | 4/2019 | Beckman | ................. | B64C 27/08 |
| 10,486,788 B2 * | 11/2019 | Piette | ...................... | H04N 5/2251 |
| 10,518,187 B2 * | 12/2019 | Zima | ...................... | B64C 39/024 |
| 10,800,505 B1 * | 10/2020 | Edsinger | ................... | B64B 1/40 |
| 2005/0219257 A1 * | 10/2005 | Lick | ........................ | B64B 1/60 345/589 |
| 2007/0103545 A1 * | 5/2007 | Listig | .................. | G09F 15/0081 348/41 |
| 2008/0090487 A1 * | 4/2008 | Randall | ................... | A63H 27/10 446/225 |
| 2008/0268742 A1 * | 10/2008 | Shenhar | ................. | A63H 27/10 446/225 |
| 2010/0171681 A1 * | 7/2010 | Cabanas | ................. | G09G 3/005 345/31 |
| 2010/0270425 A1 * | 10/2010 | Zur | ..................... | G08B 13/19632 244/33 |
| 2010/0319226 A1 | 12/2010 | Oral | | |
| 2011/0101155 A1 * | 5/2011 | Smith | .................... | B64C 39/024 244/12.1 |
| 2011/0292348 A1 * | 12/2011 | Tobita | ....................... | B64B 1/28 353/28 |
| 2016/0307448 A1 * | 10/2016 | Salnikov | ................. | A01B 79/02 |

FOREIGN PATENT DOCUMENTS

| | | |
|---|---|---|
| CN | 1825398 A | 8/2006 |
| CN | 201072489 Y | 6/2008 |
| CN | 101126887 A | 8/2008 |
| CN | 101393713 A | 3/2009 |
| CN | 104702871 A | 6/2015 |
| WO | WO 2004/114263 A1 | 12/2004 |

\* cited by examiner

FLYING ROBOT WITH INTERNAL REAR PROJECTOR

FIELD OF THE INVENTION

The present invention generally relates to a flying robot, particularly a flying robot provided with projector.

BACKGROUND OF THE INVENTION

In recent years, the intelligent robots come into the human life and provide rapid, convenient aids and service to the human. For example, a cleaning robot can automatically clean the floor, the window, etc.; and an entertainment robot can interact with the human through a voice, a sound and light, a movement, a contact reaction, etc.

These intelligent robots are mainly grouped into two types, namely a ground type and a flying type, according to the movement manner. The ground robot moves mainly depending on a wheeled or a track movement platform, such as a cleaning robot, a wireless remote control car, a self-balance scooter, etc.; and the flying robot is mostly based on a flying aircraft with rotors, such as a multi-rotor aircraft, etc.

However, on one hand, as the ground robot is vulnerable to the ground environment, such as terrain and ground obstacles, etc., the movement range is greatly restricted, and for example, it unlikely or inconveniently goes up or down stairs, or passes over obstacles, such as furniture, etc. On the other hand, in order to improve flexibility, the ground robot is often of a small volume and moves close to the ground. Even if a display or interaction device is mounted, its size is limited. Furthermore, due to the low visual angle, it is difficult to be noticed and inconvenient for the user to interact with it.

In comparison with the ground robot, the movement range of the flying robot is not confined by the terrain and the ground obstacles, and thus greatly enlarged. The flying robot is typically provided with power by propellers, in order to generate sufficient power, the propellers are required to rotate at a high speed, resulting in a considerable danger to a person or article closing the flying robot. Once touching accidently happens, a severe damage on both of them will be caused. Besides, the flight duration of the flying robot is inversely proportional to its weight and size, the theoretical flight duration of a typical civil unmanned aircraft is no more than 20 minutes, which may be less than 10 minutes during maneuvering flight, and a very limited load can be carried, such as a camera and a communication apparatus, etc. If the other apparatus, such as a human-machine interaction display, is carried, the weight of the aircraft may be more than several kilograms, and the power consumption of the power system would be greater than hundreds of watts, the flying time is further shortened and the noise is loud, which does not offer good human-machine interaction experience.

SUMMARY OF THE INVENTION

In view of the above problems contained in the existing intelligent robots, the present invention provides a flying robot having long flight duration and facilitating human-machine interaction for indoor and outdoor use.

According to one aspect of the present invention, a flying robot with projector, hereinafter abbreviated as a flying robot, is provided. The flying robot comprises: a movable end comprising a top, a main body and a bottom, wherein the top comprises a lift system, and the bottom comprises a movable end controlling/functional component and one or more projectors; and a fixed end comprising a fixed end controlling/functional component. Wherein, the movable end and the fixed end can be in wireless communication via the movable end controlling/functional component and the fixed end controlling/functional component, and the projector is configured to project images to the main body that visible from outside.

The flying robot according to the present invention comprises a movable end and a fixed end capable of communicating with each other in a wireless manner, and a distributed working mode is used on the movable end and the fixed end, i.e., the movable end implements functions of flying movement, data collection and transmission, human-machine interaction, etc., and the fixed end implements functions of data collection, data processing and analysis, controlling the flight and interaction of the movable end, and charging the movable end, etc. Such distributed design significantly reduces the weight of the movable end, thereby decreasing the power consumption of the power system and further reducing noise during the flight, and enables a long-time flight and a human-machine interaction during flight.

In the flying robot according to one embodiment of the present invention, the movable end has a substantially spherical shape (as shown in FIGS. 2 and 3), which comprises a top, a main body and a bottom connected and fixed together in known manners (e.g. by wires and data lines, etc.). Of course, those skilled in the art would contemplate that the movable end may be produced in other appropriate shapes.

The main body of the movable end constitutes the most part of the substantially spherical shape, which may be made of a flexible film material capable of being used as a rear projection screen. The interior of the main body is filled with a gas having a density less than that of the air, and the gas therein maintains a certain pressure to keep the surface of the main body smooth. As such, when the main body is full of the gas, the main body is applied a certain buoyant force in the air. Since the film material is light, the buoyant force grows with the increasing volume of the main body. This may further reduce the weight of the movable end and thus the power of the lift system required.

According to one embodiment of the present invention, the top of the movable end comprises a lift system for providing a lift force needed when the movable end is flying, and one or more proximity sensors. In other embodiments of the present invention, the one or more proximity sensors may be located at the bottom of the movable end. Since the total lift force required for the flying robot according to the present invention to fly consists of an active lift force and a buoyant force of the flying robot, the active lift force may be decreased with the increased buoyant force. According to one hand of the present invention, the lift system comprises a top housing forming a part of the spherical body, and a fan housed within the top housing. The fan may be a centrifugal fan, an axial fan or other fans that may be conceivable for those skilled in the art. The top housing comprises a top central opening and a plurality of side openings arranged at intervals along a lower periphery of the top housing. When the fan is rotating, the air is suctioned in from the top central opening, and is jetted out at a high speed from the plurality of side openings under the effect of the fan. In accordance with "Boundary Layer attachment (or Coanda Effect)", when flowing past a convex surface having a certain curvature, a smoothly flowing fluid has a tendency of staying attached to the convex surface, and therefore the air jetted at a high speed from the fan flows past the upper surface of the main body, and further in accordance with "Boundary Layer Surface Effect (or Bernoulli Effect)", an increase in the speed of a fluid occurs simultaneously with a decrease in air pressure, and thus the high-speed air flow causes the air pressure on the upper surface of the main body to be reduced such that a pressure difference is formed between the upper and lower surfaces of the main body, thereby generating an active lift force. The one or more proximity sensors are configured to sense a distance between the flying robot and a person or object nearby, avoiding collision resulting from a too close distance.

According to one embodiment of the present invention, the bottom of the movable end may comprise a movable end controlling/functional component and one or more rear projectors, the movable end controlling/functional component may comprise for example a wireless communications module, a microcontroller, a battery, a direction and steering controlling device, a camera device, a sound capturing and reproduction device, sensors, etc. The sensors may be height sensors and other sensors.

The fixed end may comprise a fixed end controlling/functional component which may comprise for example a wireless communication module, a control apparatus, a charging port, other data interfaces, etc.

According to one embodiment of the present invention, the wireless communication module of the movable end is configured to be in wireless communication with the wireless communication module of the fixed end, to transmit to the wireless communication module of the fixed end data information captured by for example the sound capturing and reproduction device, the camera device, the sensors, etc., of the movable end, and to receive a control instruction of the control apparatus of the fixed end from a wireless communication module of the fixed end and to transmit the same to the microcontroller of the movable end. The wireless communication modules may be Wi-Fi modules, wireless modules, and the like. The microcontroller of the movable end is configured to control the movable end based on the control instruction and data information sent by the control apparatus of the fixed end, so as to control flying states, display contents, sound contents, etc., of the movable end. The battery can store electric energy and supply power to the movable end controlling/functional component and the others, which may be charged via the charging port of the fixed end.

The rear projector can project images from the interior of the main body to the exterior, and the main body acts as a display screen for imaging on the flexible film forming the main body, so as to implement human-machine interaction. The image projected by the rear projector may cover the most area of the spherical body, which may implement for example 60°-360° projection and obtain a large display area, and it is beneficial to the human-machine interaction in a short distance or a long distance and can be used for advertising, consultation display, etc.

The direction and steering controlling device is configured to control the flying direction and steering of the movable end and may be one or more fans, for example, include but not limited to, a fan provided with three or more valves arranged in an angle relative to one another, three or more fans arranged in a certain angle relative to one another; two or more reversely rotatable fans arranged in an angle relative to one another; and the direction and steering controlling device may be other devices known by those skilled in the art.

The camera device is configured to capture images of the environment in which the movable end is located, including the persons interacting with the movable end and their motions, etc., so as to perform the human-machine interaction based on the motions. The sound capturing and reproduction device may be a microphone and a loudspeaker, or the like, and can perform the human-machine interaction based a sound. The height sensor is configured to sense a height of the movable end from the ground or other articles. According to needs, other sensors may comprise but not limited to, a temperature sensor, a humidity sensor, a gyro, a magnetometer, an accelerometer, and the like.

The wireless communication module of the fixed end is configured to be in wireless communication with the wireless communication module of the movable end, to receive data information captured by for example the sound capturing and reproduction device, the camera device, the sensors, etc., of the movable end, and to send to the wireless communication module of the movable end the control instruction of the control apparatus for controlling the flying states of the movable end and the projection contents of the projector.

The control apparatus of the fixed end may be a mission computer configured to perform tasks of data processing and analysis, logical operation, transmission of control instructions, human-machine interaction, etc., which may send the control instructions to the movable end automatically or based on an operator's instruction. The charging port of the fixed end is configured to charge the movable. According to other embodiments of the present invention, the charging port may be in other known forms, like a contact, socket, etc. Other data interfaces (not shown) of the fixed end may be configured to connect to a network, other computer apparatuses, etc.

The flying robot according to one embodiment of the present invention can display videos or play audios in response to movements or sounds.

According to other embodiments of the present invention, the fixed end may be a base in the form of a lamp-holder, including a charging device. When the movable end is being charged on the fixed end, the projector can project onto the main body images comprising discoloring lights, homogeneous lights, etc., and at this time, the flying robot may be used as a decorative light or an illuminating light.

According to a further aspect of the present invention, the movable end may comprise a memory, and when the movable end is turned off or unable to wirelessly communicate with the fixed end, the projector and the sound reproduction device of the movable end may voluntarily display or play videos or audios pre-stored in the memory, or the microcontroller of the movable end may control the movable end based on the instructions pre-stored in the memory.

The flying robot according to the present invention has following advantages:

(1) The rear projectors are provided to enable projection on the main body of the robot, enlarging the display area without increasing the weight, and facilitating the human-machine interaction;

(2) The distributed design is used to greatly reduce the weight of the movable end, thereby decreasing the power consumption of the power system and improving its safety in an indoor environment;

(3) The interior of the main body is filled with a gas having a density less than that of the air, such that the main body is applied a certain buoyant force in the air, which may further reduce the weight of the movable end and the power of the power system required;

(4) Since the weight of the movable end is decreased and the power of the power system is reduced, the noise during flying is significantly reduced, so as to enable a long-time flight and human-machine interaction when flying; and (5) The movable end is a spherical body or spheroid body, having a large volume, a great air resistance, and a not too fast flying speed. The main body itself may be made of a flexible material, the fan leaves of the fan are surrounded in the top housing and thus do not cause any damage even though collide with the surrounding person or article in a case of being out of control.

DETAILED DESCRIPTION

Hereinafter, a flying robot with projector according to the present invention will be described in detail with reference to the drawings. The contents described herein are merely preferred embodiments of the present invention, and those skilled in the art may envision other manners of the present invention can be implemented based on the teaching of the present invention. The position terms described herein, such as "upper", "lower", "left", "right", "top", "bottom", "horizontal", "vertical", etc., are used relative to the flying robot itself.

Figure 1:
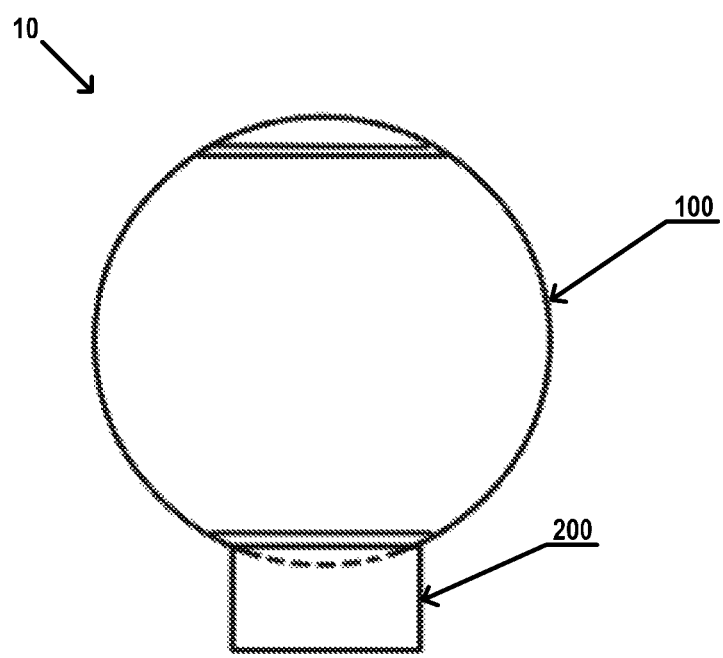
FIG. 1 is an overall diagram of a flying robot with projector according to one embodiment of the present invention.
Figure 2:
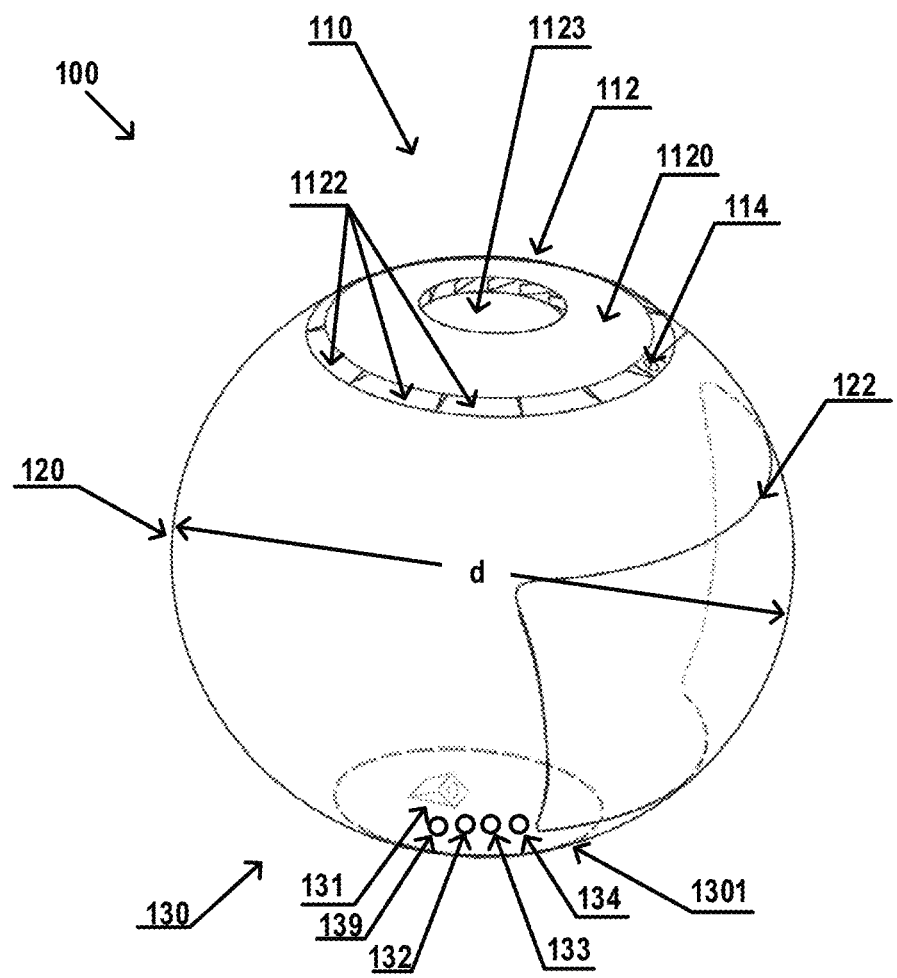
FIG. 2 is a perspective view of the movable end of the flying robot with projector in FIG. 1, as observed from an upper side.
Figure 3:
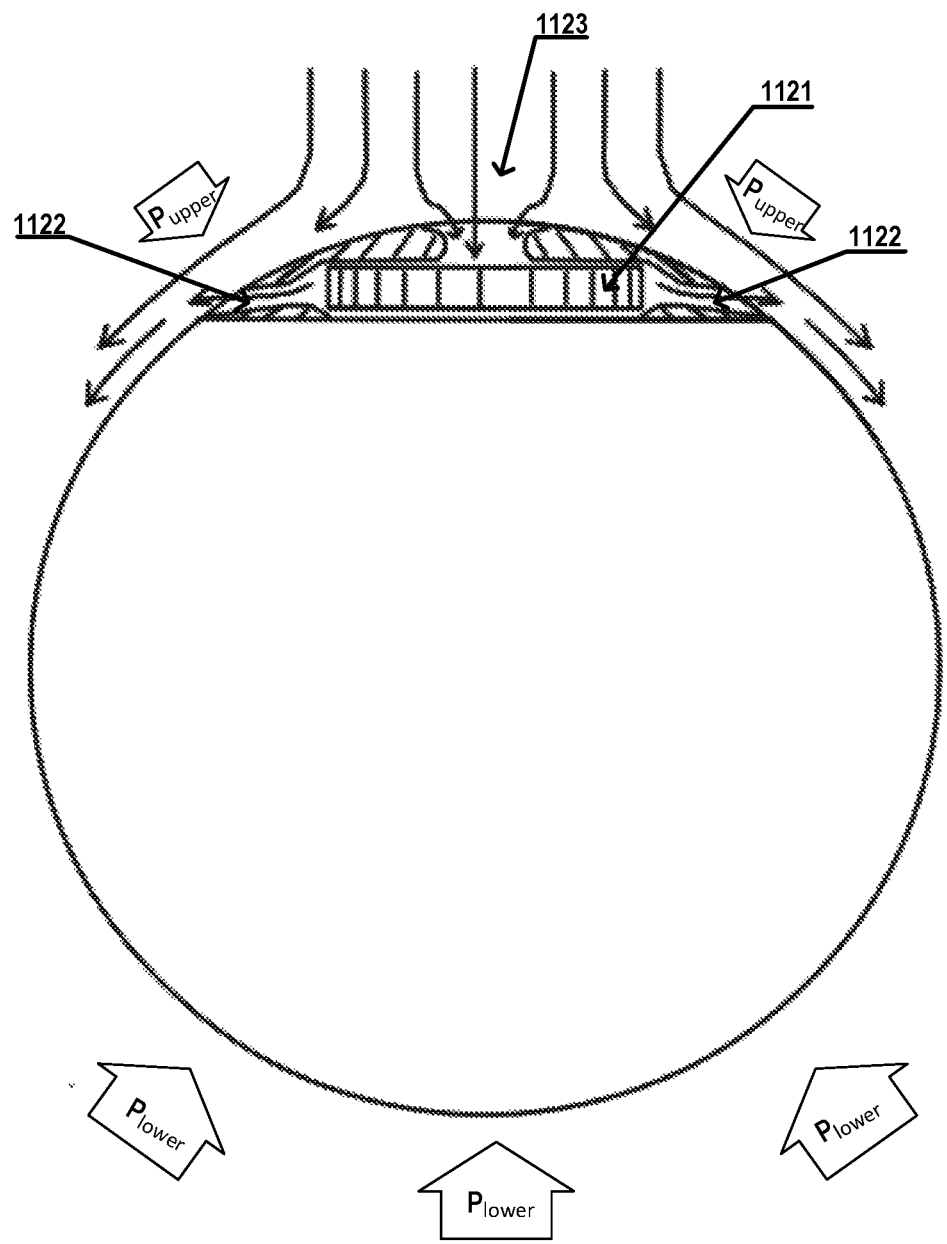
FIG. 3 is a principle diagram illustrating that how the lift system of the flying robot with projector generates a lift force.
Figure 4:
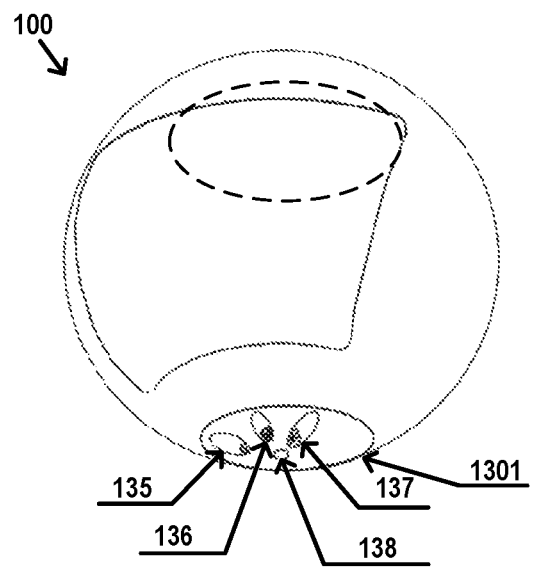
FIG. 4 is a perspective view of the movable end in FIG. 2, as observed from a lower side.

FIG. 1 is an overall diagram of a flying robot 10 with projector according to a preferred embodiment of the present invention. As shown in FIG. 1, the flying robot 10 according to a preferred embodiment of the present invention includes a movable end 100 and a fixed end 200 capable of communicating with each other in a wireless manner, and a distributed working mode is used on the movable end 100 and the fixed end 200, i.e., the movable end 100 implements functions of flying movement, data collection and transmission, human-machine interaction, etc., and the fixed end 200 implements functions of data collection, data processing and analysis, flight control, interaction control and charging of the movable end, etc. Wherein, the movable end 100 has a substantially spherical shape (as shown in FIGS. 2-4), which includes a top 110, a main body 120 and a bottom 130 connected and fixed together in known manners (e.g. by wires and data lines, etc.). Of course, those skilled in the art would contemplate that the movable end may be produced in other appropriate shapes.

FIG. 2 is a perspective view of the movable end 100 of the flying robot 10 with projector in FIG. 1, as observed from an upper side. As shown in FIG. 2, the main body 120 constitutes the most part of the substantially spherical shape, which may be made of a flexible film material capable of being used as a rear projection screen. The diameter "d" of the main body can be selected based on the use environment, the main body diameter d, if used in a family house, may be for example between 30 cm and 80 cm, preferably between 50 cm and 60 cm, and may be for example 55 cm in one embodiment; if used in a public or commercial place, such as a mall or indoor stadium, the main body diameter d may be for example between 80 cm and 300 cm, preferably between 130 cm and 250 cm, and may be for example 200 cm in one embodiment; and if used in an open place, for example outdoors, such as a square or a outdoor stadium, the main body diameter d may be for example more than 300 cm, even more than 350 cm, and may be for example 400 cm in one embodiment. Considering requirements on durability, light transmission, etc., the film material for forming the main body 120 may be selected from polyethylene, nylon, polyester, rubber, or the like. The thickness of the film may be less than 0.7 mm, for example between 0.1 mm and 0.7 mm, preferably between 0.2 mm and 0.6 mm, and may be for example about 0.2 mm in one embodiment. The interior of the main body 120 is filled with a gas having a density less than that of the air, for example helium, hot air or other gases lighter than the air, the gas filled therein maintains a certain pressure "P" to keep the surface of the main body smooth, the pressure P is one atmospheric pressure $P_{ATM}$ or is slightly greater than one atmospheric pressure $P_{ATM}$, for example between 1.05 $P_{ATM}$ and 1.20 $P_{ATM}$, and may be for example 1.10 $P_{ATM}$ in one embodiment, wherein the atmospheric pressure $P_{ATM}$ is an environment pressure and may slightly vary with the specific geographical location, weather condition, or the like. As such, when the main body 120 is full of the gas, such as helium, the main body 120 is applied a certain buoyant force in the air. Since the film material is light, the buoyant force grows with the increasing diameter d of the main body 120. This may further reduce the weight of the movable end 100 and the power needed by the lift system 112.

The top 110 includes a lift system 112 for providing a lift force needed by the movable end 100 when flying, and one or more proximity sensors 114. According to one preferred embodiment of the present invention, the lift system 112 includes: atop housing 1120 forming a part of the spherical body; a fan 1121 (as shown in FIG. 3) housed within the top housing 1120, wherein the fan 1121 may be a centrifugal fan, an axial fan or other fans that are conceivable for those skilled in the art. The top housing 1120 includes a top central opening 1123 and a plurality of side openings 1122. As shown in FIGS. 2 and 3, the side openings 1122 are arranged at intervals along a lower periphery of the top housing 1120.

FIG. 3 is a principle schematic diagram illustrating that how the lift system 112 of the flying robot 10 with projector generates a lift force, wherein thin arrows represent an air flow direction, and thick arrows represent an air pressure. As shown in FIG. 3, when the fan 1121 is rotating, the air is suctioned in from the top central opening 1123 of the top housing 1120, and is jetted out under the effect of the fan 1121 at a high speed from the plurality of side openings 1122 arranged with an interval therebetween along a lower periphery of the top housing 1120. In accordance with "Boundary Layer attachment (or Coanda Effect)", when flowing past a convex surface having a certain curvature, a smoothly flowing fluid has a tendency of staying attached to the convex surface, and therefore the air jetted at a high speed from the plurality of side openings 1122 flows past the upper surface of the main body 120, and further in accordance with "Boundary Layer Surface Effect (or Bernoulli Effect)", an increase in the speed of a fluid occurs simultaneously with a decrease in pressure, and thus the high-speed air flow reduces the air pressure $P_{upper}$ on the upper surface of the main body 120, such that the air pressure $P_{upper}$ on the upper surface is less than an air pressure $P_{lower}$ on an lower surface, and a pressure difference $\Delta P = P_{lower} - P_{upper}$ is formed between the upper and lower surfaces of the main body 120, thereby generating an active lift force. A total lift force of the flying robot of the present application is a sum of the buoyant force and the active lift force. In some cases, the active force is about 5% of the total lift force, or even lower.

As shown in FIG. 2, the one or more proximity sensors 114 are disposed on a lower periphery of the top housing 1120, and configured to sense a distance between the flying robot 10 and a person or object nearby, avoiding collision resulting from a too close distance. Certainly, those skilled in the art may envision that, in other embodiments of the present invention, the proximity sensors 114 may be disposed at other positions of the flying robot 10, for example at the bottom 130, or at both the top 110 and the bottom 130.

FIG. 4 is a perspective view of the movable end 100 in FIG. 2, as observed from a lower side. As shown in FIGS. 2 and 4, the bottom 130 includes: a bottom housing 1301; a projector 131, a wireless communications module 132, a microcontroller 133, a battery 134, a direction and steering controlling device 135, a camera device 136, a sound capturing and reproduction device 137, a height sensor 138, other sensors (not shown), etc., housed within the bottom housing 1301. In some embodiments, the projector 131 may be a mini-type rear projector.

Figure 5:
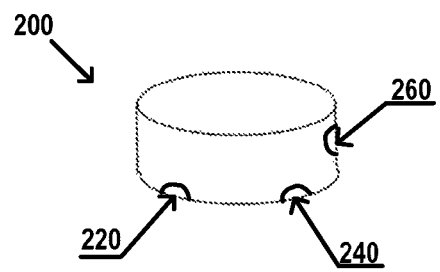
FIG. 5 is a diagram of a fixed end of the flying robot with projector in FIG. 1.

FIG. 5 is a diagram of the fixed end 200 of the flying robot 10 with projector. As shown in FIG. 5, the fixed end 200 includes a wireless communication module 220, a control apparatus 240 and a charging port 260. In one embodiment, the fixed end 200 further includes other data interfaces (not shown).

According to an embodiment of the present invention, the wireless communication module 132 of the movable end 100 is configured to be in wireless communication with the wireless communication module 220 of the fixed end 200, to transmit to the wireless communication module 220 of the fixed end 200 data information captured by the sound capturing and reproduction device 137, the camera device 136, the sensor, etc., of the movable end 100, and to receive a control instruction of the control apparatus 240 of the fixed end 200 from a wireless communication module 220 of the fixed end 200 and to transmit the same to the microcontroller 133 of the movable end 100. The wireless communication modules 132 and 220 may be Wi-Fi modules, wireless modules, or the like. The microcontroller 133 is configured to control the movable end 100 based on the control instructions and the data information sent by the control apparatus 240 of the fixed end 200, so as to control the flying states, display contents, sound contents, etc., of the movable end 100. The battery 134 can store electric energy and supply power to the movable end 100, which may be charged via the charging port 260 of the fixed end 200.

According to the present invention, the projector 131 is configured to project images from the interior of the main body 120 to the outside. The main body 120 acts as a display screen for imaging on the flexible film forming the main body 120, so as to implement human-machine interaction. The images 122 projected by the projector 131 may cover most of the main body 120, for example, the projection may be a 60°-360° projection.

In addition, according to an embodiment of the present disclosure, the direction and steering controlling device 135 is configured to control a flying direction and steering of the movable end 100, which may be one or more fans. In one embodiment, the direction and steering controlling device 135 may be a fan with three or more valves arranged in a certain angle relative to one another, wherein the flying direction and steering of the movable end 100 may be controlled by controlling closing and opening of the valves. In another embodiment, the direction and steering controlling device 135 may be three or more fans arranged in a certain angle relative to one another. In a further embodiment, the direction and steering controlling device 135 may be two or more reversely rotatable fans arranged in an angle relative to one another. Of course, those skilled in the art would appreciate that the direction and steering controlling device may be a device other than the fan(s).

Besides, according to an embodiment of the present invention, the camera device 136 is configured to capture images of the environment in which the movable end 100 is located, including the persons interacting with the movable end 100 and their motions, etc., so as to perform the human-machine interaction based on the motions. The sound capturing and reproduction device 137 may be a microphone and a loudspeaker, or the like, and is configured to perform the human-machine interaction via the sounds. The height sensor 138 is configured to sense a height of the movable end 100 from the ground or other articles. According to needs, the other sensors may include but not limited to, a temperature sensor, a humidity sensor, a gyro, a magnetometer, an accelerometer, and the like.

According to an embodiment of the present invention, the wireless communication module 220 of the fixed end 200 is configured to be in wireless communication with the wireless communication module 132 of the movable end 100, to receive data information captured by for example the sound capturing and reproduction device 137, the camera device 136, the sensor, etc., of the movable end 100, and to send to the wireless communication module 132 of the movable end 100 the control instructions of the control apparatus 240, for example for controlling the flying states of the movable end 100 and the projection contents of the projector 131.

Moreover, the control apparatus 240 of the fixed end 200 may be a mission computer configured to perform tasks of data processing and analysis, logical operation, transmission of control instructions, human-machine interaction, etc. The control apparatus 240 may send the control instructions to the movable end 100 based on an operator's instructions or automatically based on a pre-stored program. The charging port 260 can charge the movable end. In other embodiments of the present invention, the charge port 260 may be in other known forms, like a contact, socket, etc. Other data interfaces (not shown) may be configured to connect to a network, other computer apparatuses, etc.

Figure 6:
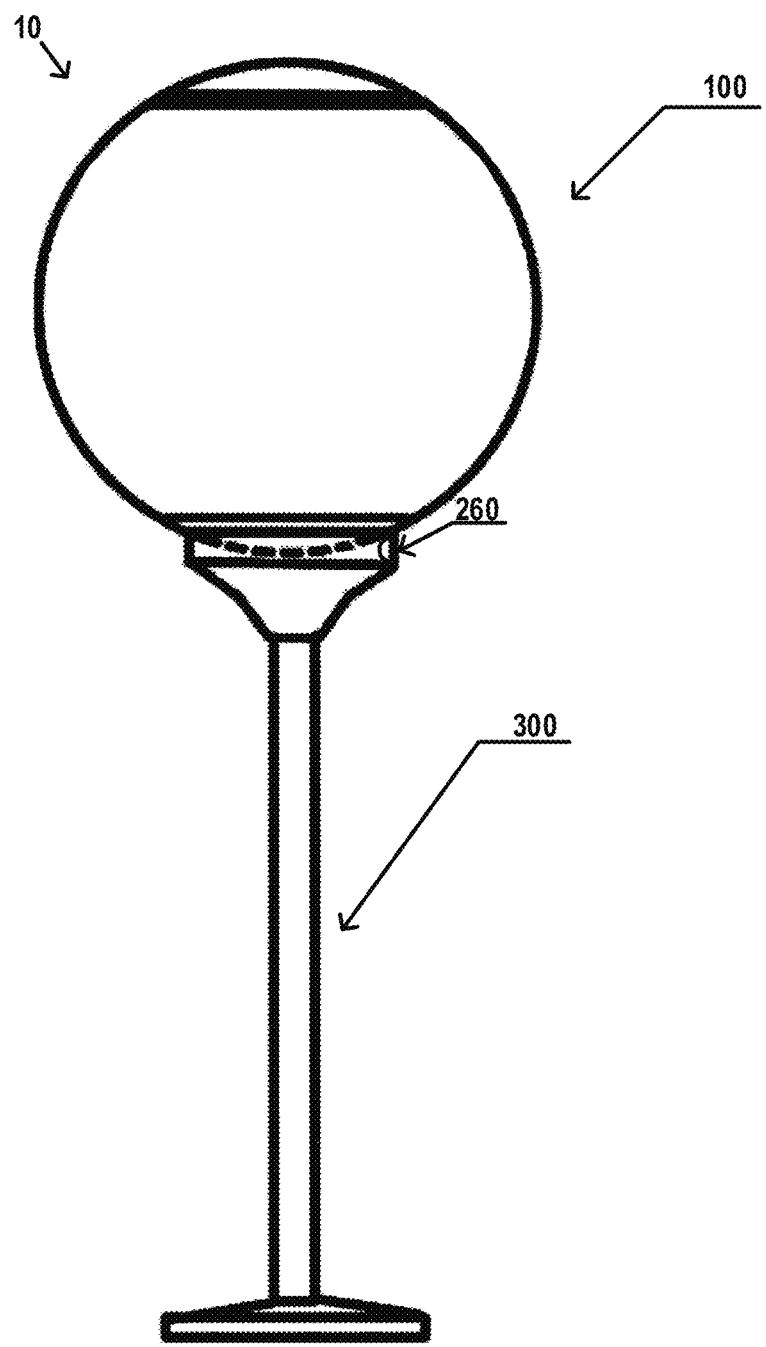
FIG. 6 is an overall diagram of a flying robot with projector according to another embodiment of the present invention, wherein a fixed end is a lamp-holder base.

FIG. 6 is an overall diagram of the flying robot 10 with projector according to another embodiment of the present invention. As shown in FIG. 6, the fixed end 300 is a base in the form of a lamp-holder. When the movable end 100 is being charged on the fixed end 300, the rear projector 131 within the flying robot 10 may project images which include discoloring lights, homogeneous lights, etc. At this time, the flying robot 10 may be used as a decorative light or an illuminating light.

According to other embodiments of the present invention, the movable end 100 may include a memory 139. When the fixed end 200 is turned off or unable to be in wireless communication, the projector 131 and the sound capturing and reproduction device 137 of the movable end 100 may voluntarily display or play the videos or audios pre-stored in the memory, or the microcontroller 133 of the movable end

100 may control the movable end 100 based on the instructions pre-stored in the memory.

With reference to the drawings, the foregoing describes the embodiments of the present disclosure in detail. However, it should be appreciated by those skilled in the art that the above specific description is only exemplary, which is provided for illustration, rather than limiting the protection scope of the present invention. For example, the proximity sensors 114 may be disposed at the top or bottom of the spherical body, or may be at both the top and the bottom; the control apparatus 240 may include any suitable general processor, data signal processor, microcontroller, dedicated hardware, etc. The control apparatus 240 may further include or be connected to a random access memory (RAM), a Read-Only Memory (ROM), a storage apparatus, a network interface, etc.; and the control apparatus 240 may execute a computer program instruction sequence to implement various programs.

The protection scope of the present invention is only defined by the appended claims. Taught by the present invention, those skilled in the art can make various variants, modifications or substitution to the present invention according to specific conditions, without departing from the scope of the present invention.

I claim:

1. A flying robot system, comprising:
    a movable end comprising a top, a main body and a bottom, wherein the top comprises a lift system having a fan that generates lift via the Coanda effect, and the bottom comprises a movable end controller and one or more projectors; and
    a fixed end comprising a fixed end controller;
    wherein the movable end and the fixed end are configured to be in wireless communication via the movable end controller and the fixed end controller, and
    wherein the one or more projectors comprises at least one rear projector configured to project images from an interior of the main body onto a surface of the main body, the projected images being visible from outside of the main body.

2. The flying robot system according to claim 1, characterized in that the main body is made of a film material, within which a gas having a density less than that of the air is filled.

3. The flying robot system according to claim 2, wherein the lift system comprises:
    a top housing comprising a top central opening and a plurality of side openings, and
    wherein the fan is housed within the top housing, and is configured to jet air outwards from the plurality of side openings over the surface of the main body.

4. The flying robot system according to claim 3, characterized in that the fan is a centrifugal fan or an axial fan.

5. The flying robot system according to claim 2, characterized in that a lift force provided by the lift system is 5% or less of a total lift force of the movable end.

6. The flying robot system according to claim 1, wherein the lift system comprises:
    a top housing comprising a top central opening and a plurality of side openings, and
    wherein the fan is housed within the top housing, and is configured to jet air outwards from the plurality of side openings over the surface of the main body.

7. The flying robot system according to claim 6, characterized in that the fan is a centrifugal fan or an axial fan.

8. The flying robot system according to claim 1, characterized in that the images are 60-360° images.

9. The flying robot system according to claim 8, wherein:
    the fixed end is a base in the form of a lamp-holder base comprising a charging device, and
    the one or more projectors are configured to project images on the main body when the movable end is charged on the fixed end.

10. The flying robot system according to claim 9, characterized in that the images comprise homogeneous lights.

11. The flying robot system according to claim 1, characterized in that the movable end controller and/or the fixed end controller comprise(s) one or more proximity sensors.

12. The flying robot system according to claim 1, wherein the bottom of the movable end further comprises:
    a microphone configured to capture sounds, and
    a camera configured to capture motions;
    wherein the movable end controller is configured to display images via the one or more projectors or play audios via a speaker in response to motions captured using the camera or sounds captured using the microphone.

13. The flying robot system according to claim 1, characterized in that the movable end comprises a memory, and the movable end controller is configured to cause the movable end to automatically display videos or play audios pre-stored in the memory when the movable end is unable to wirelessly communicate with the fixed end.

14. The flying robot system according to claim 1, characterized in that a shape of the movable end is substantially spherical.

* * * * *